June 30, 1964     S. R. FARRELL     3,139,525
SHADOW APPARATUS FOR MEASURING ELECTRON BEAM DIVERGENCE
Filed June 28, 1960
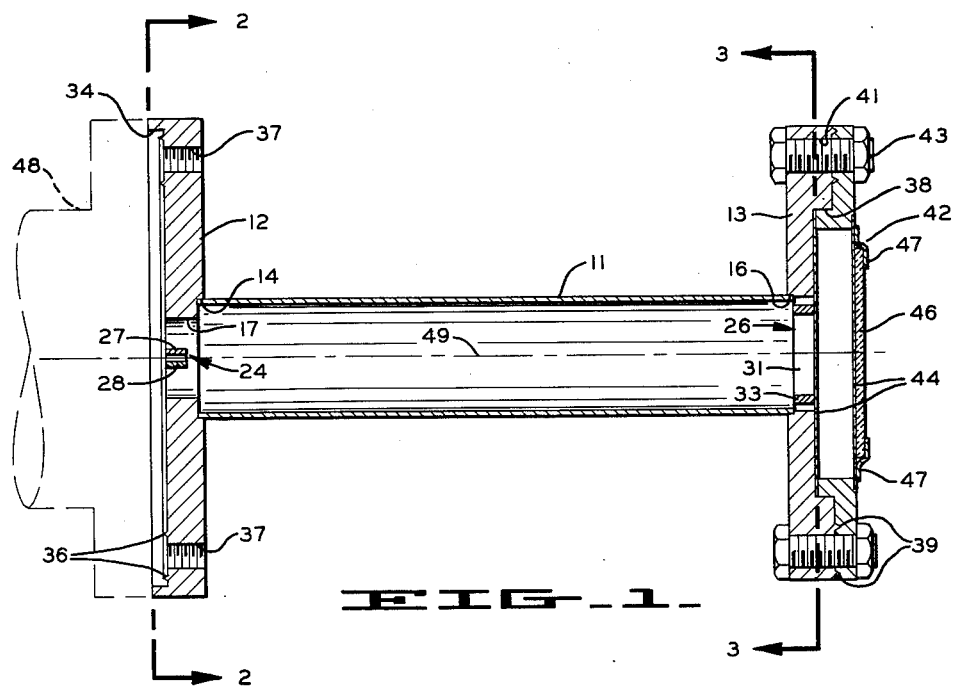
FIG. 1.
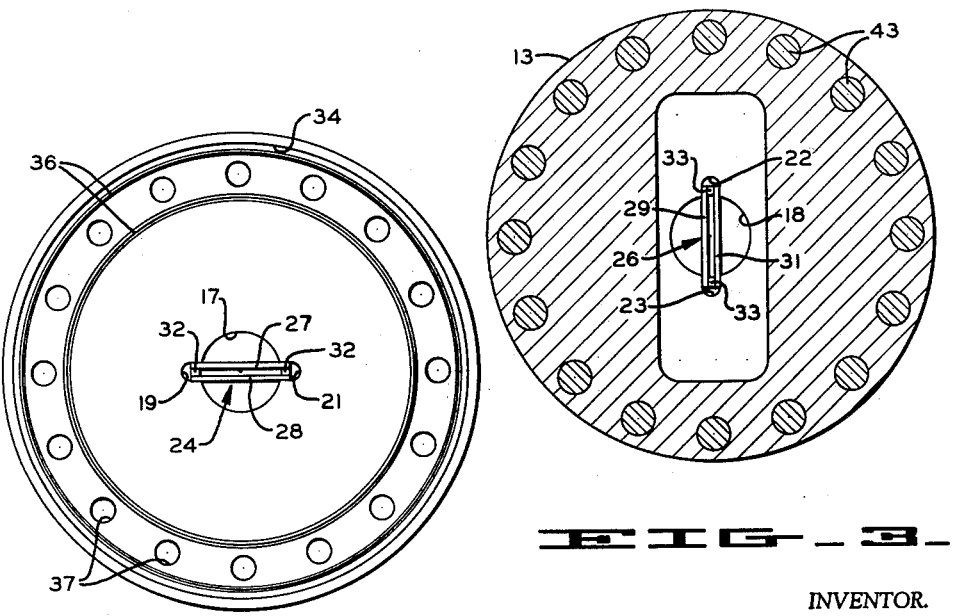
FIG. 2.
FIG. 3.
INVENTOR.
SHERMAN R. FARRELL
BY *Schapp & Hatch*
ATTORNEYS

United States Patent Office 3,139,525
Patented June 30, 1964

3,139,525
SHADOW APPARATUS FOR MEASURING
ELECTRON BEAM DIVERGENCE
Sherman R. Farrell, Orinda, Calif., assignor, by mesne assignments, to High Voltage Engineering Corporation, Burlington, Mass., a corporation of Massachusetts
Filed June 28, 1960, Ser. No. 39,323
3 Claims. (Cl. 250—49.5)

The present invention relates to beam divergence measurement of charged particle beams, and more particularly to a method and apparatus for measuring the divergence of an electron beam in vacuo at the output of an electron beam producing machine.

It is of importance in radiation processing, therapy and the like, to determine with extreme accuracy various characteristics of the beam of ionizing radiation. One of these characteristics which is of importance to determine is the amount of divergence of the beam at the output end of a beam producing machine, e.g., a linear electron accelerator.

It has been extremely difficult, if not impossible, with previous measuring techniques, to determine the beam divergence with sufficient accuracy. To be useful, the accuracy of the measurement should be on the order of one-tenth to one milliradian.

I have provided a simple solution to the problem of accurate beam divergence measurement which is based upon the observation that elements of certain dense materials, such as tungsten, when inserted in an electron beam cast a shadow that can be recorded on any of several sensitive materials. Where a grid of two or more strips of dense material is introduced into the beam and their shadows recorded at some distance farther down the beam, the separation of the shadow centers can be related to the separation of the actual centers of the strips so as to provide an extremely accurate measurement of the beam divergence.

It is, therefore, an object of my invention to measure electron beam divergence with extreme accuracy on the order of one-tenth to one milliradian.

Another object of the present invention is the provision of simple compact apparatus for facilitating an accurate direct measurement of beam divergence at the output end of an electron beam producing machine such as an electron linear accelerator.

It is a further object of the invention to provide a method and apparatus for producing a shadowgraph from parallel spaced elements of dense material disposed in an electron beam and for determining the divergence of the beam by relating the separation between the centers of the shadows to a reference separation such as the actual separation between the centers of the elements.

Further objects and advantages of my invention will appear as the specification proceeds, and the new and useful features of the same will be fully defined in the claims attached hereto.

The preferred form of the invention is illustrated in the accompanying drawing forming part of this application, in which:

FIGURE 1 is an elevational section view of the preferred apparatus for measuring beam divergence in accordance with the present invention;

FIGURE 2, an end view taken along line 2—2 of FIGURE 1; and

FIGURE 3, a sectional view taken along line 3—3 of FIGURE 1.

While I have shown only the preferred form of the invention, it should be understood that various changes or modifications made be made within the scope of the claims hereto attached, without departing from the spirit of the invention.

Considering now the invention in some detail relative to the method thereof, it is first to be noted that certain dense materials, e.g., tungsten, when disposed in an electron beam are opaque to the electrons. Accordingly, where objects of such dense materials are placed in a beam, and the beam is permitted to impinge upon a beam sensitive material spaced downstream from the objects, the beam cross-section is recorded on the sensitive material except for shadows cast by the opaque objects. Such a shadowgraph is utilized to great advantage in the measurement of beam divergence in accordance with the present invention.

According to the present invention, two or more closely spaced preferably parallel bars or wires of dense material, preferably stungsten, are placed across the axis of an electron beam in vacuo. A shadowgraph is then made at some distance spaced downstream, viz., in the direction of beam travel, from the parallel objects. The shadowgraph is produced by causing the beam to impinge upon an electron sensitive material, such as a glass slide, placed transverse to the beam axis.

The shadows cast by the bars tend to become fuzzy at their edges in proportion to the separation between the bars and recording material, however the centers of the shadows are easily located to within a few thousandths of an inch. It will be appreciated, moreover, that the separation of the shadow centers is dependent upon the divergence of the beam and the separation of the recording material from the bars. Hence, it is necessary only to determine the shadow center separation, as by removing the recording material and measuring the shadow separation on the shadowgraph with calipers and a micrometer. The beam divergence is then found by computing the shadow separation minus the actual bar separation divided by the axial distance between the bars and recording material.

A somewhat more accurate determination of the beam divergence may be made in an analogous manner to that just described but utilizing the shadow center separation of a second set of bars located close to the recording material as a reference. More specifically, the second set of bars is identical to the first and oriented 90° relative thereto at a location very close to the recording material, produces a shadowgraph with very little indicated divergence permitting its use as a reference for comparison with the shadowgraph of the first set of bars.

In this case the divergence is derived from the separation of the shadow centers due to the first set of bars minus that due to the second set of bars divided by the axial distance between the sets of bars.

The foregoing method has been found in practice to be accurate to within one-tenth to one milliradian where an eight inch axial separation between sets of bars is employed. It will be appreciated, however, that the accuracy may be increased by employing greater axial separation between the sets of bars.

Although the method of the invention may be conducted with a variety of means, a single preferred compact beam divergence measuring assembly is illustrated in the drawing and now described. More specifically the drawing illustrates a divergence measuring assembly adapted for vacuum sealed connection to the output flange of an electron linear accelerator, or other electron beam producing machine. Broadly, the assembly comprises a vacuum envelope having positioning means at its opposite ends for positioning first and second sets of closely spaced parallel bars or the like, of electron opaque material, across the axis of the envelope, the first and second sets preferably being oriented at 90° to each other. In addition, one end of the envelope is adapted for vacuum sealed coaxial attachment to the electron beam producing machine whereas the other end is provided with an electron beam permeable vacuum sealed closure wall. A sheet of electron beam sensitive material is removably secured to this closure wall for producing the shadowgraph.

Considering now the beam divergence measuring assembly in greater detail as to its preferred structure, the envelope is provided by an elongated cylindrical tube 11 having input and output flanges 12 and 13 vacuum sealed to its opposite ends. More specifically, the inner faces of the flanges 12 and 13 are provided with circular recesses 14 and 16, respectively, for receiving the opposite ends of the tube in vacuum sealed relation therewith. The flanges 12 and 13 are also provided with central circular apertures 17 and 18 within the compass of the tube cross section.

The edges of the apertures 17 and 18 are provided with sets of diametrically opposed axially-extending grooves 19, 21 and 22, 23, respectively, such sets of grooves being oriented 90° with respect to each other. Slit assemblies 24, 26 are secured within grooves 19, 21 and 22, 23, and these slit assemblies respectively comprise flat parallel bars 27, 28 and 29, 31 of tungsten or equivalent dense material closely spaced as by means of spacer blocks 32 and 33 at their opposite ends. With the pairs of bars 27, 28 and 29, 31 engaging the opposite sides of grooves 19, 21 and 22, 23, the edges of the bars will extend transversely across tube 11.

The input flange 12 is provided at its outer face with a circular recess 34 having a pair of concentric outwardly projecting spaced annular knife edges 36 and a plurality of circumferentially spaced bolt holes 37 therebetween. Such arrangement facilitates vacuum sealed attachment of the assembly to a mating output flange of an electron beam producing machine in the conventional manner as by means of flange bolts.

The output flange 13 is adapted to contain the electron beam permeable closure wall of previous mention to which the shadowgraph recording material may be removably secured. More specifically, the outer face of the flange is provided with a generally rectangular recess 38 extending transversely across the aperture 18 and a pair of concentric, projecting annular knife edges 39 with circumferentially spaced bolt holes 41 therebetween. Such arrangement facilitates vacuum sealed attachment of a beam window assembly 42 to the flange by means of bolts 43.

As depicted in the drawing, the window assembly is of the double walled foil variety including closely spaced aluminum foil walls 44, however, any other variety of window such as a single foil may alternatively be employed.

A glass slide 46 or equivalent electron sensitive recording means is here removably secured to the outside of the window 42 as by means of strips of tape 47 to complete the divergence measuring assembly, or, alternatively, the recording slide 46 could be mounted inside the tube 11.

With the assembly constructed as just described, and the input flange 12 thereof secured in vacuum sealed relation to the output flange 48 of a linear accelerator, or other electron beam producing machine, the operation generally follows from the method of the invention previously detailed herein. The electron beam 49 emanating from the accelerator passes coaxially through the aperture 17, tube 11, aperture 18, and window 42 to then impinge upon glass slide 46. The beam "burns" into the slide 46 to discolor the same except in regions where the beam is blocked by the edges of the opaque bars 27, 28 and 29, 31, such bars thus casting shadows recorded in the resulting shadowgraph produced on the glass slide.

The slide is then removed and the separation between the centers of the shadows produced by bars 27, 28 and the separation between those produced by bars 29, 31 determined with the aid of measuring devices such as ordinary calipers and a micrometer. The beam divergence is then computed by subtracting the separation of the shadows produced by bars 29, 31 from the separation of the shadows produced by bars 27, 28 and dividing by the axial distance between the pairs of bars.

What is claimed is:

1. Beam divergence measuring apparatus comprising envelope means for vacuum sealed coaxial attachment to the output end of an electron beam producing device and having an electron permeable vacuum sealed closure wall at its distal end relative to the device, said wall being normal to and in intercepting relationship with the electron beam produced by said device, a plurality of thin spaced elements of electron opaque material disposed in a plane transverse to the axis of said envelope means in axial spaced relation from said closure wall, said elements being in intercepting relationship and symmetrically spaced with respect to the axis of said electron beam, and an electron sensitive material exteriorly secured to said closure wall, said electron sensitive material being positioned thereon so as to intercept shadows cast by said spaced elements and said electron beam.

2. Beam divergence measuring apparatus comprising an elongated tube adapted for vacuum sealed coaxial end attachment to the output end of an electron beam producing device, a radiation window secured in vacuum sealed closing relation to the distal end of said tube relative to the device, said window being normal to and in intercepting relationship with the electron beam produced by said device, first and second sets of thin parallel spaced electron opaque elements respectively secured in first and second planes transverse to the axis of said tube and each at the opposite ends thereof, said elements being in intercepting relationship and symmetrically spaced with respect to the axis of said electron beam, and an electron sensitive sheet removably secured to the exterior of said window, said electron sensitive sheet being positioned thereon so as to intercept shadows cast by said electron opaque elements and said electron beam.

3. Beam divergence measuring apparatus according to claim 2, further defined by said sets of elements being radially oriented ninety degrees relative to each other.

References Cited in the file of this patent

UNITED STATES PATENTS

| | | |
|---|---|---|
| 1,431,271 | Van Allen | Oct. 10, 1922 |
| 2,103,645 | Schlesinger | Dec. 28, 1937 |
| 2,263,733 | Knoll | Nov. 25, 1941 |
| 2,464,586 | Klein et al. | Mar. 15, 1949 |
| 2,812,440 | Hartman et al. | Nov. 5, 1957 |
| 2,990,493 | Seehof et al. | June 27, 1961 |